(12) United States Patent
Hur

(10) Patent No.: US 12,710,080 B2
(45) Date of Patent: Aug. 18, 2026

(54) BRAKE DUST COLLECTOR

(71) Applicant: HL MANDO CORPORATION, Pyeongtaek-si (KR)

(72) Inventor: Jaejin Hur, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 346 days.

(21) Appl. No.: 18/380,811

(22) Filed: Oct. 17, 2023

(65) Prior Publication Data

US 2024/0229877 A1 Jul. 11, 2024

(30) Foreign Application Priority Data

Jan. 9, 2023 (KR) ........................ 10-2023-0002867

(51) Int. Cl.
*F16D 65/00* (2006.01)
*B01D 46/00* (2022.01)
*B01D 46/56* (2022.01)

(52) U.S. Cl.
CPC ..... *F16D 65/0031* (2013.01); *B01D 46/0004* (2013.01); *B01D 46/0005* (2013.01); *B01D 46/56* (2022.01); *B01D 2265/02* (2013.01)

(58) Field of Classification Search
CPC ............ F16D 65/0031; B01D 46/0004; B01D 46/0005; B01D 46/56; B01D 2265/02
USPC ...................................................... 188/218 A
See application file for complete search history.

(56) References Cited

U.S. PATENT DOCUMENTS 4,732,242 A 3/1988 Heibel
10,072,716 B2 * 9/2018 Metayer .................. F16D 55/22
11,796,019 B2 * 10/2023 Kaufmann .......... F16D 65/0031
2007/0000740 A1 1/2007 Raab
(Continued)

FOREIGN PATENT DOCUMENTS

DE 84 28 099 U1 1/1985
DE 10 2009 021 203 A1 1/2010
(Continued)

OTHER PUBLICATIONS

The Extended European Search Report dated Feb. 14, 2024 for corresponding European Patent Application No. 23197035.1, (6 pages).

(Continued)

*Primary Examiner* — Christopher P Schwartz
(74) *Attorney, Agent, or Firm* — Hauptman Ham, LLP

(57) ABSTRACT

Disclosed herein is a brake dust collector. The brake dust collector in accordance with one embodiment of the present disclosure may include: a pair of brake pads that are respectively disposed on both sides of a disc rotating together with a wheel and are in close contact with or separated from the disc according to a forward and backward movement of a piston; a housing having the brake pads embedded therein and provided to cover at least a part of the disc; a main fastening portion having a main fastening hole formed to penetrate a trailing portion of the housing in a radial direction; and a main filter module including a main filter provided in the main fastening hole and a main filter cover through which at least one main flow hole is formed to penetrate and which supports the main filter, and the main filter module may be provided to be detachable from the main fastening portion.

20 Claims, 5 Drawing Sheets

(56) References Cited

U.S. PATENT DOCUMENTS

| | | | |
|---|---|---|---|
| 2009/0071767 | A1 | 3/2009 | Bass et al. |
| 2010/0065387 | A1 | 3/2010 | Tsiberidis |
| 2014/0076673 | A1 | 3/2014 | Tsiberidis |
| 2017/0198772 | A1 | 7/2017 | Rocca-Serra |
| 2018/0031059 | A1 | 2/2018 | Gelb |
| 2020/0271176 | A1 | 8/2020 | Bock et al. |
| 2021/0246953 | A1 | 8/2021 | Bock et al. |

FOREIGN PATENT DOCUMENTS

| | | | | |
|---|---|---|---|---|
| DE | 10 2020 118 880 | A1 | 1/2022 | |
| DE | 10 2020 125 399 | A1 | 3/2022 | |
| DE | 10 2021 102 775 | A1 | 8/2022 | |
| EP | 4105511 | A1 | 12/2022 | |
| FR | 2815099 | A1 * | 4/2002 | ......... F16D 65/0031 |
| JP | 2010-508481 | A | 3/2010 | |
| KR | 10-2112358 | B1 | 5/2020 | |
| KR | 10-2021-0078491 | A | 6/2021 | |
| KR | 10-2022-0094325 | A | 7/2022 | |
| WO | 2022/219849 | A1 | 10/2022 | |

OTHER PUBLICATIONS

Office Action issued on Oct. 23, 2025, for corresponding European Patent Application No. 23197035.1, 13 pages.

Office Action dated Apr. 14, 2026, for the corresponding Korean Patent Application No. 10-2023-0002867, along with an English machine translation (Total 10 pages).

* cited by examiner

BRAKE DUST COLLECTOR

CROSS-REFERENCE TO RELATED APPLICATION

This application claims the benefit of Korean Patent Application No. 10-2023-0002867, filed on Jan. 9, 2023 in the Korean Intellectual Property Office, the disclosure of which is incorporated herein by reference.

BACKGROUND

1. Field

Embodiments of the present disclosure relate to a brake dust collector, and more particularly, to a brake dust collector fastened to a housing with a trailing portion, which is formed to extend, and capable of not only collecting dust generated by friction between a brake pad and a disc but also improving stiffness of the housing.

2. Description of the Related Art

As the importance of environmental protection is emphasized, environmental friendliness has become a big issue in the automobile industry, and regulations on pollutants emitted from automobiles are also being continuously strengthened.

Meanwhile, pollutants emitted from vehicles may be largely classified into pollutants emitted from an exhaust system and pollutants emitted from a non-exhaust system. The pollutants emitted from the exhaust system are pollutants contained in exhaust gas, which is generated when an engine of a vehicle is driven, and are already subject to regulations, while the pollutants emitted from the non-exhaust system are expected to be subject to corresponding regulations.

Specifically, among the pollutants emitted from the non-exhaust system, dust generated due to abrasion caused by a frictional force between a brake pad and a disc during vehicle braking contains a large number of harmful substances, so that a method for minimizing the dust is required in line with the fact that regulations on harmful dust and fine dust are gradually tightening.

In addition, since a fixed-type caliper brake including a monoblock caliper usually provides relatively stable braking power even in high-speed repetition, vehicle models to which the fixed-type caliper brake is applied are relatively high-performance vehicles and a large amount of dust is generated between discs and brake pads, and thus a method of reducing the dust is required all the more urgently.

Meanwhile, in order to meet the requirement, the conventional dust collector is provided as a separate device for dust collection on one side of a caliper housing, which reduces aesthetics and also reduces maintainability because the device body should be removed from the vehicle to clean or replace the filter.

SUMMARY

It is an aspect of the present disclosure to provide a brake dust collector capable of effectively reducing dust that is generated by a friction force between a disc and a brake pad and discharged to the outside of a housing.

It is another aspect of the present disclosure to provide a brake dust collector capable of collecting dust through a tangential air flow generated by rotation of a disc without a separate flow control element for dust guide.

It is still another aspect of the present disclosure to provide a brake dust collector capable of improving maintainability of a filter by forming a filter module to be detachable.

It is yet another aspect of the present disclosure to provide a brake dust collector capable of reinforcing stiffness of a housing itself and also preventing the deterioration in aesthetics of a caliper due to a filter module since the filter module is formed to be detachable from a portion formed to extend to a trailing portion side of the housing.

It is yet another aspect of the present disclosure to provide a brake dust collector capable of improving filter efficiency and extending filter life by providing an additional filter module on a window side.

It is yet another aspect of the present disclosure to provide a brake dust collector capable of facilitating management of a filter by enabling the filter to be cleansed by washing liquid and the like even in a state where a filter module is mounted.

It is yet another aspect of the present disclosure to provide a brake dust collector capable of further improving heat dissipation performance in exhausting heat caused by friction between a disc and a brake pad to the outside of a housing.

Additional aspects of the disclosure will be set forth in part in the description which follows and, in part, will be obvious from the description, or may be learned by practice of the disclosure.

In accordance with one embodiment of the present disclosure, a brake dust collector includes a pair of brake pads that are respectively disposed on both sides of a disc rotating together with a wheel and are in close contact with or separated from the disc according to a forward and backward movement of a piston, a housing having the brake pads embedded therein and provided to cover at least a part of the disc, a main fastening portion having a main fastening hole formed to penetrate a trailing portion of the housing in a radial direction, and a main filter module including a main filter provided in the main fastening hole and a main filter cover through which at least one main flow hole is formed to penetrate and which supports the main filter, and the main filter module is provided to be detachable from the main fastening portion.

The main filter module may be bolted to the main fastening portion.

The main fastening portion may further include a fastening bracket formed to protrude in the radial direction and a fastening hole formed to penetrate the fastening bracket in a forward and backward direction of the brake pads so that a bolt member passes therethrough, and the main filter module and the fastening bracket may be bolted with the bolt member in the forward and backward direction of the brake pads.

The main filter may be made of a metal with corrosion resistance.

The main filter cover may be mounted with an end side at a predetermined space from the housing or the main fastening portion.

The main filter cover may include an outer circumferential portion formed in a direction parallel to an outer circumferential surface of the disc and a pair of planar portions disposed in a direction parallel to both side surfaces of the disc, and the main flow hole may be formed to penetrate at least one of the outer circumferential portion or the pair of planar portions.

In addition, the housing may be formed as a monoblock.

Meanwhile, in accordance with another embodiment of the present disclosure, a brake dust collector includes a pair of brake pads that are respectively disposed on both sides of a disc rotating together with a wheel and are in close contact with or separated from the disc according to a forward and backward movement of a piston, a housing having the brake pads embedded therein and provided to cover at least a part of the disc, a main fastening portion having a main fastening hole formed to penetrate a trailing portion of the housing in a radial direction, a main filter module provided to be detachable from the main fastening portion and including a main filter provided in the main fastening hole and a main filter cover through which at least one main flow hole is formed to penetrate and which supports the main filter, a sub fastening portion having a sub fastening hole formed to penetrate a window of the housing in the radial direction, and a sub filter module provided to be detachable from the sub fastening portion and provided as a sub filter provided in the sub fastening hole, and a sub filter cover configured to support the sub filter.

The main filter module and the sub filter module may be bolted to the main fastening portion and the sub fastening portion, respectively.

The main fastening portion may further include a fastening bracket formed to protrude in the radial direction and a fastening hole formed to penetrate the fastening bracket in a forward and backward direction of the brake pads so that a bolt member passes therethrough, and the main filter module and the fastening bracket may be bolted with the bolt member in the forward and backward direction of the brake pads.

The sub filter cover may further include a rib formed to protrude from an outer surface and a fastening hole formed to penetrate the rib so that a bolt member passes therethrough, and the sub filter module and the rib may be coupled to each other as the bolt member penetrates the fastening hole and is bolted to the housing or the sub fastening portion.

Each of the main filter and the sub filter may be made of a metal with corrosion resistance and/or heat resistance.

The main filter cover may be mounted with an end side at a predetermined space from the housing or the main fastening portion.

The sub filter cover may be mounted with an end side at a predetermined space from the housing or the sub fastening portion.

The sub filter cover may further include a flow passage formed to be recessed on a bottom surface and formed to extend from a leading portion to a trailing portion.

The main filter cover may include an outer circumferential portion formed in a direction parallel to an outer circumferential surface of the disc and a pair of planar portions disposed in a direction parallel to both sides of the disc, and the main flow hole may be formed to penetrate at least one of the outer circumferential portion or the pair of planar portions.

The main flow hole provided in the outer circumferential portion may be formed to be tilted downward from an inner side to an outer side of the main filter cover.

The housing may be formed as a monoblock.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art. The present disclosure is not limited to the embodiments shown herein but may be embodied in other forms. The drawings may omit the illustration of parts not related to the description in order to clarify the present invention, and slightly exaggerate the size of the components to help understanding.

Figure 1:
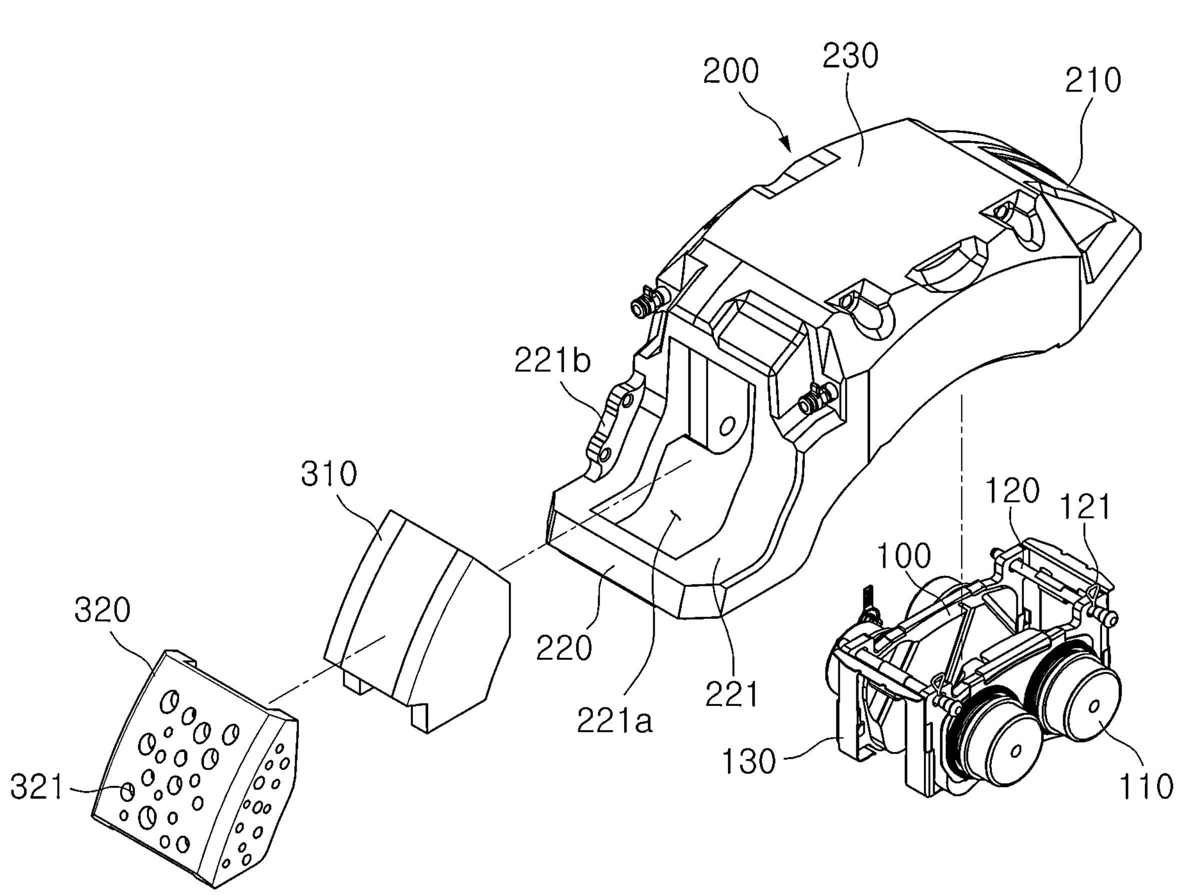
FIG. 1 is an exploded perspective view illustrating a brake dust collector in accordance with one embodiment of the present disclosure.
Figure 2:
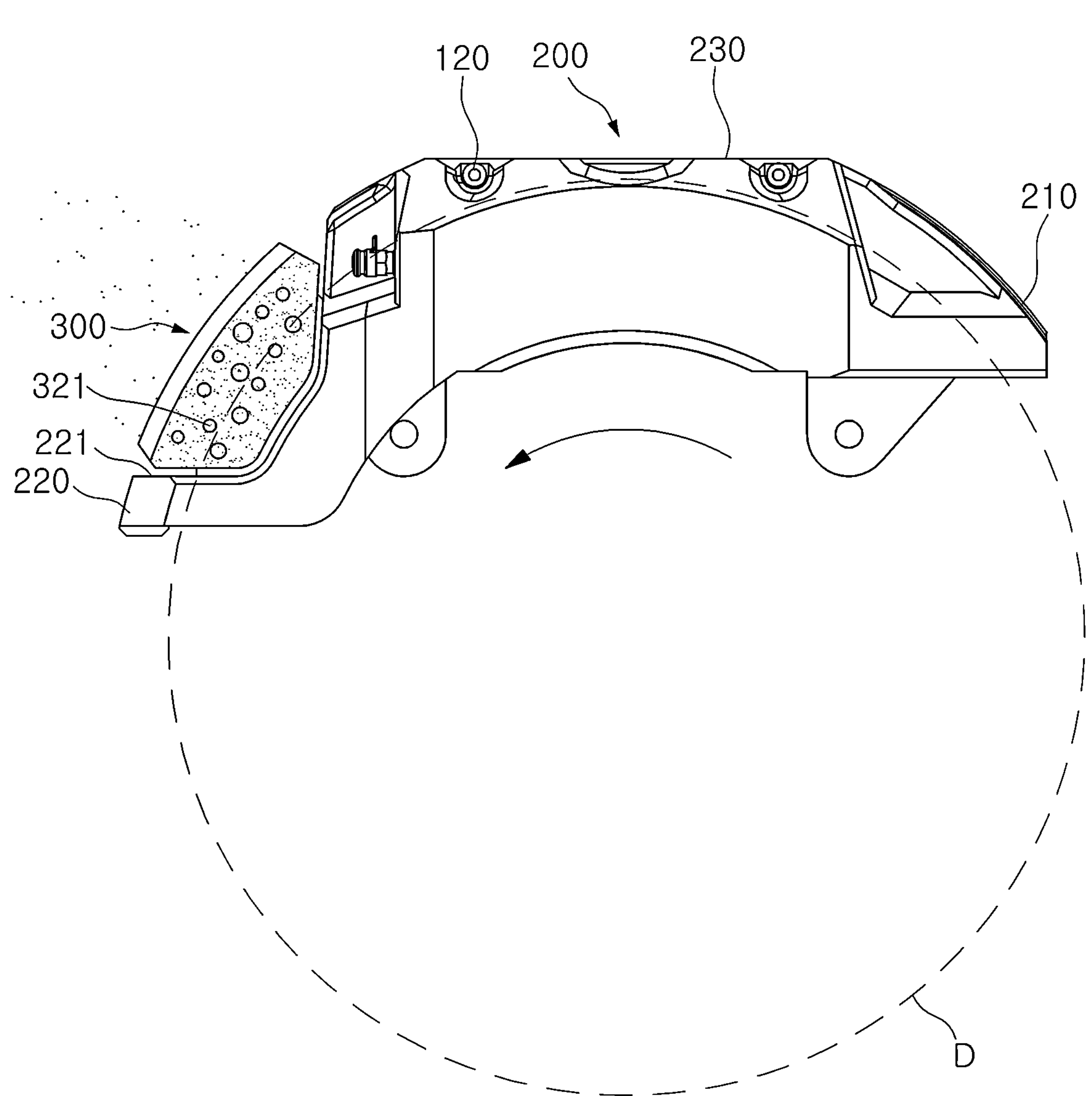
FIG. 2 is a view illustrating a state where the brake dust collector in accordance with one embodiment of the present disclosure is coupled.

FIG. 1 is an exploded perspective view illustrating a brake dust collector in accordance with one embodiment of the present disclosure, and FIG. 2 is a view illustrating a state where the brake dust collector in accordance with one embodiment of the present disclosure is coupled.

Referring to FIGS. 1 and 2, a brake dust collector in accordance with one embodiment of the present disclosure includes a brake pad 100, a housing 200, and a main filter module 300.

More specifically, the brake pad 100 includes a piston 110, a guide pin 120, and a pad spring 130 disposed on both sides of a disc D. The brake pad 100 rotates together with a wheel and is in close contact with or separated from both sides of the disc D. When advancing or retreating due to the piston 110, the brake pad 100 provides a braking force to the disc D.

Herein, the piston 110 may move the brake pad 100 forward and backward by various methods including a hydraulic method or an electromechanical method, and although FIG. 1 illustrates that the piston 110 is coupled to the brake pad 100, the piston 110 may be installed by being inserted into a groove provided inside the housing 200.

In addition, the guide pin 120 is coupled to the brake pad 100 by penetrating both the upper sides of the brake pad 100. The guide pin 120 is longitudinally placed in the forward and backward direction of the brake pad 100, and thus guides the forward and backward movement of the brake pad 100.

In addition, although the guide pin 120 is illustrated to be coupled to the brake pad 100 in FIG. 1, the guide pin 120 may be actually formed, as illustrated in FIG. 2, with one end penetrating the housing 200 and supported inside the housing 200 and the other end supported by being exposed to the outside of the housing 200.

Herein, the guide pin 120 may be fixed by such a tool as a fixing clip 121 to be prevented from being separated from the housing 200.

In addition, the pad spring 130 is a leaf spring where a plurality of bent portions are formed. The pad spring 130 is installed on each of both ends of the brake pad 100 to cover a part of the guide pin 120 and support a lower part of the brake pad 100. Thus, the pad spring 130 not only supports the brake pad 100, but also enables the smooth forward and backward movement of the brake pad 100.

Meanwhile, the brake pad 100 is not limited to the above-described configuration and structure but may apply various methods of providing a braking force to the disc D by simultaneously being in close contact with or separated from both sides of the disc D.

In addition, the brake pad 100 may apply brake structures with various response types including a passive type or an active type.

Meanwhile, the housing 200 has a cover shape capable of covering a part of the disc D on a lower side, while the brake pad 100 is installed on an inner side, and includes a leading portion 210 formed on one side, a trailing portion 220 formed on the other side, and a window 230 formed between the leading portion 210 and the trailing portion 220.

In addition, the housing 200 may be formed in various structures including a monoblock type where the leading portion 210, the trailing portion 220, and the window 230 are integrally formed.

More specifically, if the disc D rotates in a counterclockwise direction, as illustrated in FIG. 2, the leading portion 210 and the trailing portion 220 are on the right side and the left side, respectively, and the window 230 is formed between the leading portion 210 and the trailing portion 220.

Herein, the trailing portion 220 is formed to extend in a lower left direction and includes a main fastening portion 221 to which the main filter module 300 is fastened.

Herein, the main fastening portion 220 includes a main fastening hole 221*a*, which is formed to penetrate toward the disc D, and a fastening bracket 221*b* for mounting the main filter module 300.

In addition, although the fastening bracket 221*b* may be embodied in various shapes, when the housing 200 is mounted in a vehicle and the like, the fastening bracket 221*b* may be formed on one side of the main fastening hole 221*a* in order to be prevented from exposure to the outside.

Meanwhile, the main filter module 300 includes a main filter 310, which covers the main fastening hole 221*a* and has a cover shape corresponding to a shape of the trailing portion 220. A main filter cover 320 may be configured to support and protect the main filter 310.

In addition, although various known materials are applicable, the main filter 310 may be made of a corrosion-resistant metal material or heat resistant metal material to minimize deformation due to an external force.

In addition, the main filter cover 320 includes a multiple number of main flow holes 321, which are formed on an overall surface. The main filter cover 320 may be formed of a metal material to protect and support the main filter 310.

Herein, the main flow holes 321 may be formed to have a sufficient area so that various fluids can smoothly pass therethrough.

In addition, when the main flow holes 321 are formed in an outer circumferential portion that is a surface located on an outer circumferential surface of the disc D, the main flow holes 321 may be formed to be tilted downward from the inner side to the outer side. Therefore, the main flow holes 321 may correspond to a direction of an air flow generated by the rotation of the disc D so that heat generated by the braking operation may be discharged more effectively.

In addition, a bush structure (not illustrated) may be applied to a location corresponding to the fastening bracket 221*b* in order to bolt the main filter cover 320 to the fastening bracket 221*b*.

In addition, in order to sufficiently discharge heat generated by friction between the brake pad 100 and the disc D to the outside, when the main filter module 300 is mounted on the main fastening portion 220, a predetermined gap may be formed so that each of the upper and lower ends does not come into close contact with the main fastening portion 220.

Accordingly, in the brake dust collector in accordance with aspects of the present disclosure, the main filter module 300 may be easily detached from the housing 200, and the main filter 310 may also be cleansed by high-pressure washing liquid flowing into the main flow holes 321, while the main filter module 300 is mounted on the housing 200.

In addition, in the brake dust collector in accordance with the present disclosure, since the main filter module 300 is mounted on the side of the trailing portion 220, although a separate air flow control element is omitted as illustrated in FIG. 2, the air flow generated by the rotation of the disc D effectively guides dust, which is generated by friction between the brake pad 100 and the disc D, to the inner side of the main filter 310, so that dust collection efficiency may be improved.

In addition, in the brake dust collector in accordance with the present disclosure, the stiffness of the housing 200 may be further improved since the trailing portion 220 is formed to extend to mount the main filter module 300 and the main filter module 300 is bolted thereto.

Figure 3:
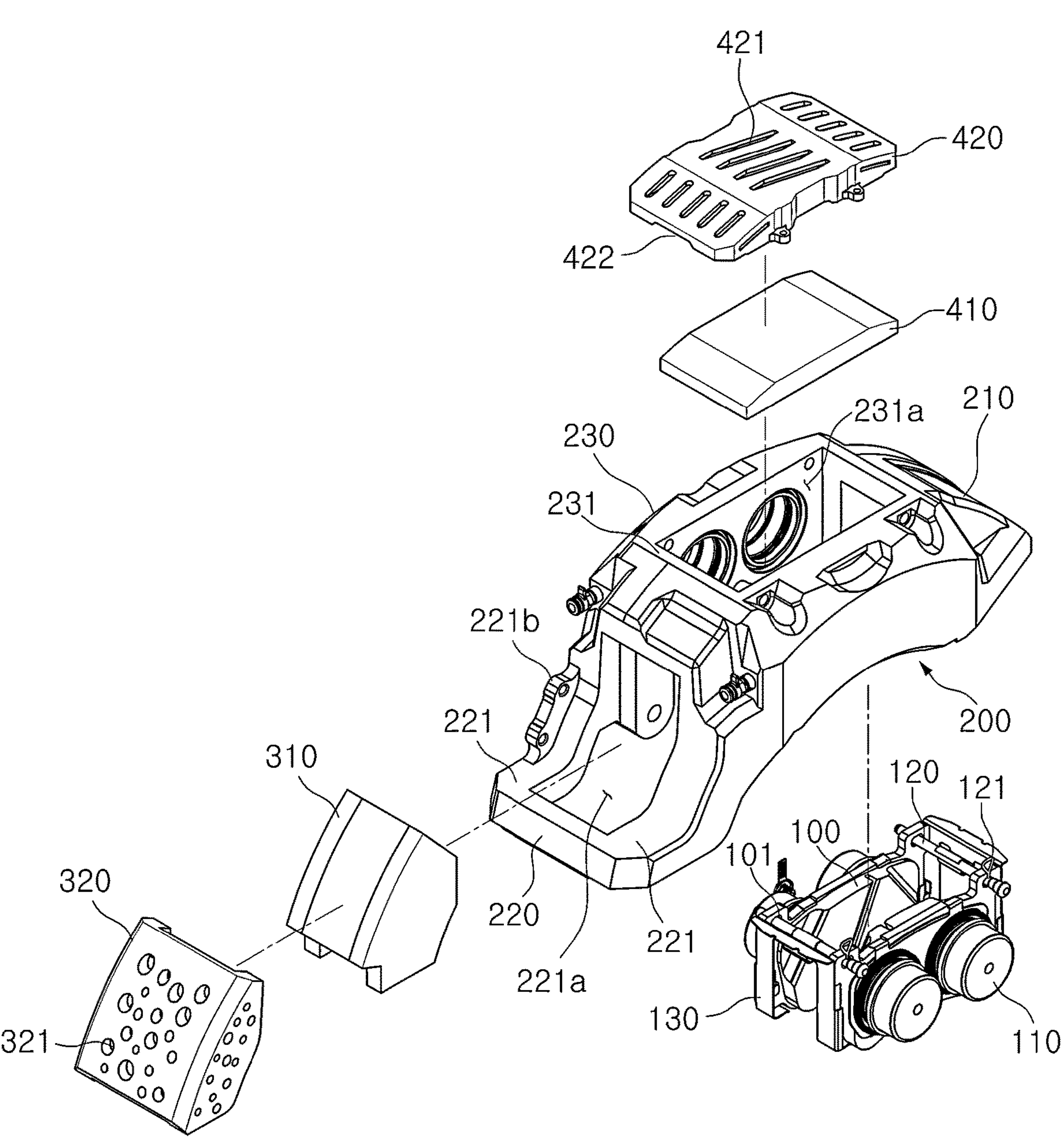
FIG. 3 is an exploded perspective view illustrating a brake dust collector in accordance with another embodiment of the present disclosure.
Figure 4:
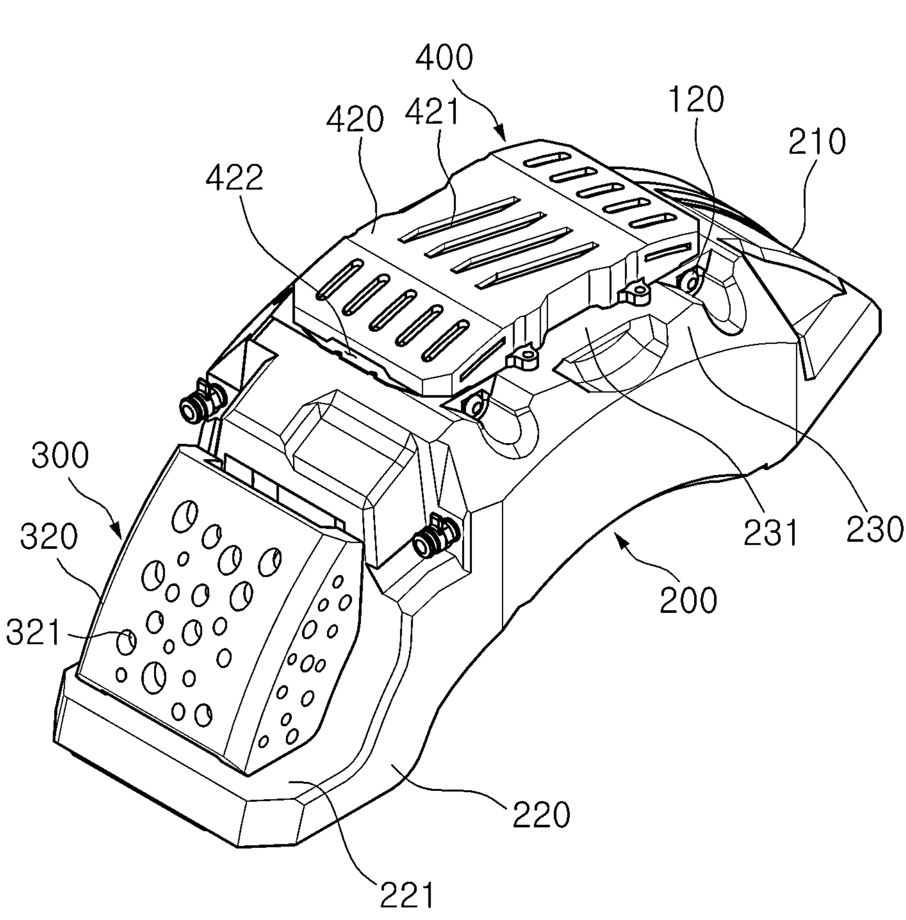
FIG. 4 is a perspective view illustrating a state where the brake dust collector in accordance with another embodiment of the present disclosure is coupled.
Figure 5:
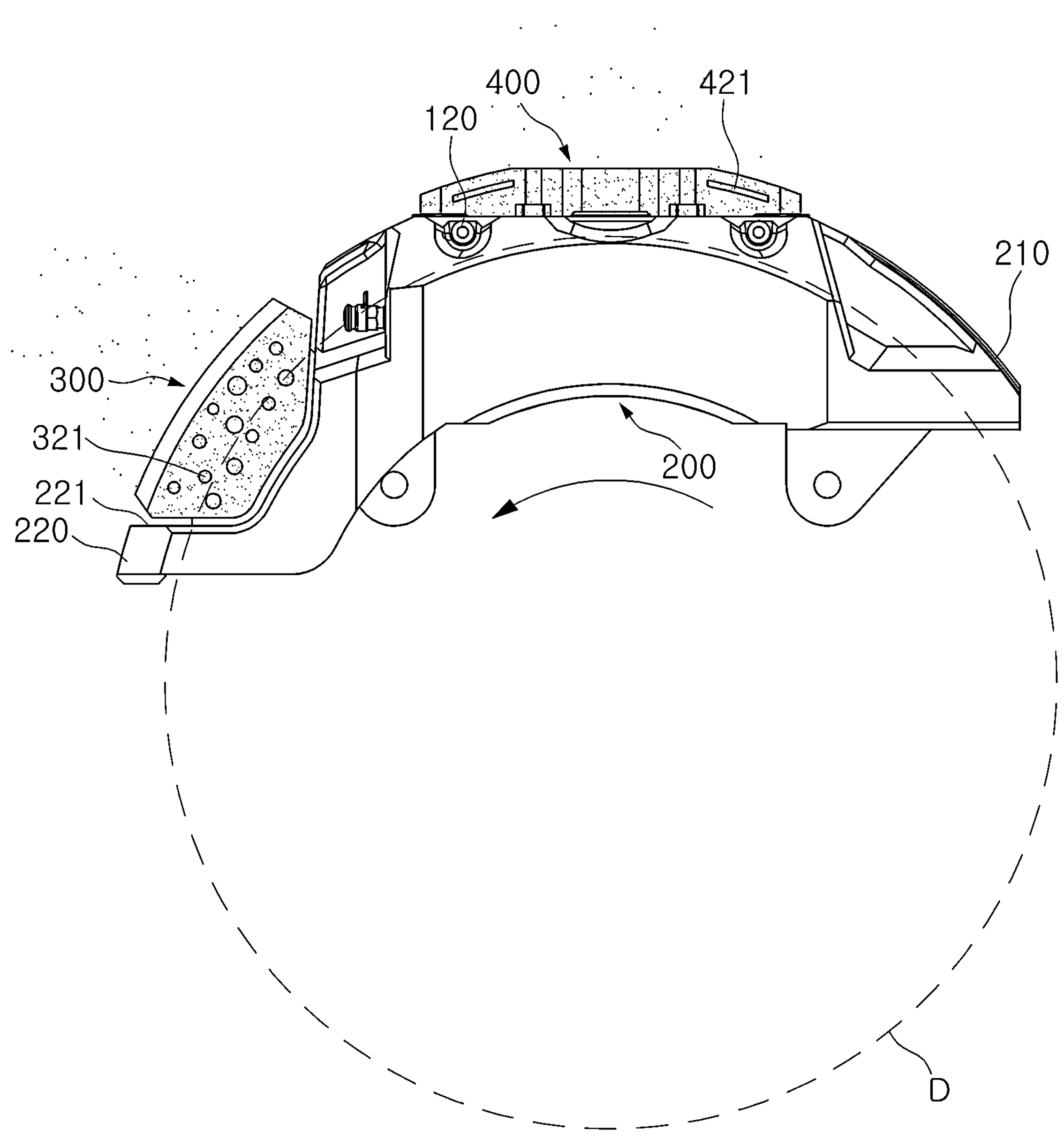
FIG. 5 is a view illustrating a state where the brake dust collector in accordance with another embodiment of the present disclosure is coupled.

Meanwhile, FIG. 3 is an exploded perspective view illustrating a brake dust collector in accordance with another embodiment of the present disclosure. FIG. 4 is a perspective view illustrating a state where the brake dust collector in accordance with another embodiment of the present disclosure is coupled. FIG. 5 is a view illustrating a state where the brake dust collector in accordance with another embodiment of the present disclosure is coupled.

Referring to FIGS. 3 to 5, a brake dust collector in accordance with another embodiment of the present disclosure further includes a sub filter module 400 in the same or similar configuration to the above-described embodiment.

To this end, in the housing 200, a sub fastening portion 231 detachable from the sub filter module 400 is additionally formed by including a sub fastening hole 231*a* formed to penetrate to the side of the disc D in the window 230.

More specifically, as illustrated in FIG. 3, the brake pad 100 may be installed in the housing 200 more easily since the sub fastening hole 231*a* is formed above the brake pad 100 embedded in the housing 200.

Meanwhile, the sub filter module 400 includes a sub filter 410, which covers the sub fastening hole 231*a* and has a cover shape corresponding to the shape of the window 230. The sub filter module 400 also includes a sub filter cover 420 configured to support and protect the sub filter 410.

Herein, although various known materials are applicable, the sub filter 410 may be made of a corrosion-resistant metal or heat-resistant metal material to minimize deformation due to an external force.

In addition, the sub filter cover 420 includes a multiple number of sub flow holes 421 formed on an overall surface and a flow passage 422. The sub filter cover 420 is formed on a lower side to extend to be recessed in a direction from the leading portion 210 to the trailing portion 220. The sub filter cover 420 is formed of a metal material to protect and support the sub filter 410, and is bolted to the sub fastening portion 231.

Herein, the sub flow holes 421 may be formed to have a sufficient area so that various fluids can pass through smoothly.

In addition, through the flow passage 422, the sub filter module 400 does not completely close the sub fastening hole 231*a* but forms a predetermined gap on the side of the leading portion 210 and on the side of the trailing portion 220. As a result, the heat dissipation performance may be further improved for heat generated during friction between the brake pad 100 and the disc D.

Accordingly, as illustrated in FIG. 5, the brake dust collector in accordance with the present disclosure may reduce dust generated by friction between the brake pad 100 and the disc D more effectively through the main filter module 300 and the sub filter module 400.

In addition, in the brake dust collector in accordance with the present disclosure, the main filter module 300 and the sub filter module 400 may be easily detached from the housing 200, and the main filter 310 and the sub filter 410 may also be cleansed by high-pressure washing liquid flowing into the main flow holes 321 and the sub flow holes 421, while the main filter module 300 and the sub filter module 400 are mounted on the housing 200, so that filter life extension and efficiency improvement may be expected.

A brake dust collector in accordance with the present embodiment can effectively collect dust that is generated by a friction force between a disc and a brake pad and discharged to the outside of a housing.

A brake dust collector in accordance with the present embodiment can collect dust through a tangential air flow generated by rotation of a disc without a separate flow control element for dust guide.

A brake dust collector in accordance with the present embodiment can improve maintainability by forming a filter module to be detachable.

A brake dust collector in accordance with the present embodiment can not only reinforce stiffness of a housing itself but also prevent the deterioration in aesthetics due to a filter module since the filter module is formed to be detachable from a portion formed to extend to a trailing portion side of the housing.

A brake dust collector in accordance with the present embodiment can improve filter efficiency and extend filter life by providing an additional filter module on a window side.

A brake dust collector in accordance with the present embodiment can prevent decline of filter efficiency by enabling a filter to be cleansed by washing liquid and the like even in a state where a filter module is mounted.

A brake dust collector in accordance with the present embodiment can further improve heat dissipation performance in exhausting heat caused by friction between a disc and a brake pad to the outside of a housing.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A brake dust collector comprising:

a pair of brake pads that are respectively disposed on both sides of a disc configured to rotate together with a wheel and are in close contact with or separated from the disc according to a forward and backward movement of a piston;

a housing having the brake pads embedded therein and configured to cover at least a part of the disc;

a main fastening portion having a main fastening hole formed to penetrate a trailing portion of the housing in a radial direction; and a main filter module including a main filter provided in the main fastening hole and a main filter cover through which at least one main flow hole is formed to penetrate and which is configured to support the main filter, wherein the main filter module is configured to be detachable from the main fastening portion.

2. The brake dust collector of claim 1, wherein the main filter module is bolted to the main fastening portion.

3. The brake dust collector of claim 2, wherein the main fastening portion further comprises:

a fastening bracket formed to protrude in the radial direction; and a fastening hole formed to penetrate the fastening bracket in a forward and backward direction of the brake pads so that a bolt member passes therethrough, and wherein the main filter module and the fastening bracket are bolted with the bolt member in the forward and backward direction of the brake pads.

4. The brake dust collector of claim 1, wherein the main filter is made of a metal with corrosion resistance and heat resistance.

5. The brake dust collector of claim 1, wherein the main filter cover is mounted with an end side at a predetermined space from the housing or the main fastening portion.

6. The brake dust collector of claim 1, wherein the main filter cover comprises an outer circumferential portion formed in a direction parallel to an outer circumferential surface of the disc and a pair of planar portions disposed in a direction parallel to both side surfaces of the disc, and the main flow hole is formed to penetrate at least one of the outer circumferential portion or the pair of planar portions.

7. The brake dust collector of claim 1, wherein the housing is formed as a monoblock.

8. A brake dust collector comprising:

a pair of brake pads that are respectively disposed on both sides of a disc configured to rotate together with a wheel and are in close contact with or separated from the disc according to a forward and backward movement of a piston;

a housing having the brake pads embedded therein and configured to cover at least a part of the disc;

a main fastening portion having a main fastening hole formed to penetrate a trailing portion of the housing in a radial direction;

a main filter module provided to be detachable from the main fastening portion and including a main filter provided in the main fastening hole and a main filter cover through which at least one main flow hole is formed to penetrate and which is configured to support the main filter;

a sub fastening portion having a sub fastening hole formed to penetrate a window of the housing in the radial direction; and a sub filter module provided to be detachable from the sub fastening portion and including a sub filter provided in the sub fastening hole and a sub filter cover configured to support the sub filter.

9. The brake dust collector of claim 8, wherein the main filter module is bolted to the main fastening portion.

10. The brake dust collector of claim 9, wherein the main fastening portion further comprises a fastening bracket formed to protrude in the radial direction and a fastening hole formed to penetrate the fastening bracket in a forward and backward direction of the brake pads so that a bolt member passes therethrough, and the main filter module and the fastening bracket are bolted with the bolt member in the forward and backward direction of the brake pads.

11. The brake dust collector of claim 8, wherein the sub filter module is bolted to the sub fastening portion.

12. The brake dust collector of claim 8, wherein the sub filter cover further comprises a rib formed to protrude from an outer surface and a fastening hole formed to penetrate the rib so that a bolt member passes therethrough, and the sub filter module and the rib are coupled to each other as the bolt member penetrates the fastening hole and is bolted to the housing or the sub fastening portion.

13. The brake dust collector of claim 8, wherein the main filter is made of a metal with corrosion resistance and heat resistance.

14. The brake dust collector of claim 8, wherein the sub filter is made of a metal with corrosion resistance and heat resistance.

15. The brake dust collector of claim 8, wherein the main filter cover is mounted with an end side at a predetermined space from the housing or the main fastening portion.

16. The brake dust collector of claim 8, wherein the sub filter cover is mounted with an end side at predetermined space from the housing or the sub fastening portion.

17. The brake dust collector of claim 16, wherein the sub filter cover further comprises a flow passage formed to be recessed on a bottom surface and formed to extend from a leading portion to a trailing portion.

18. The brake dust collector of claim 8, wherein the main filter cover comprises an outer circumferential portion formed in a direction parallel to an outer circumferential surface of the disc and a pair of planar portions disposed in a direction parallel to both sides of the disc, and the main flow hole is formed to penetrate at least one of the outer circumferential portion or the planar portions.

19. The brake dust collector of claim 18, wherein the main flow hole provided in the outer circumferential portion is formed to be tilted downward from an inner side to an outer side of the main filter cover.

20. The brake dust collector of claim 8, wherein the housing is formed as a monoblock.

* * * * *